(12) United States Patent
Cignetti et al.

(10) Patent No.: US 11,671,264 B1
(45) Date of Patent: Jun. 6, 2023

(54) VALIDATING CERTIFICATE INFORMATION BEFORE SIGNING

(71) Applicant: Amazon Technologies, Inc., Seattle, WA (US)

(72) Inventors: Todd Cignetti, Ashburn, VA (US); Trevoli Ponds-White, Seattle, WA (US); Michael S. Slaughter, Stone Mountain, GA (US); Param Sharma, Haymarket, VA (US); Kyle Benjamin Schultheiss, Centreville, VA (US); Chris Stoner, Lusby, MD (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 17/024,983

(22) Filed: Sep. 18, 2020

(51) Int. Cl.
*H04L 9/40* (2022.01)
*H04L 9/32* (2006.01)

(52) U.S. Cl.
CPC .......... *H04L 9/3268* (2013.01); *H04L 9/3247* (2013.01)

(58) Field of Classification Search
CPC ............................ H04L 9/3268; H04L 9/3247
See application file for complete search history.

(56) References Cited

U.S. PATENT DOCUMENTS

| | | | | |
|---|---|---|---|---|
| 6,108,788 A | * | 8/2000 | Moses | G06F 21/602 713/155 |
| 6,763,459 B1 | * | 7/2004 | Corella | H04L 9/3268 713/182 |
| 6,981,148 B1 | * | 12/2005 | Jim | H04L 63/102 713/168 |
| 10,979,232 B2 | * | 4/2021 | Messerges | H04L 9/3268 |
| 11,025,408 B2 | * | 6/2021 | Pala | H04W 4/50 |
| 2001/0032314 A1 | * | 10/2001 | Ansper | H04L 9/3247 713/176 |
| 2004/0030888 A1 | * | 2/2004 | Roh | H04L 63/0823 713/156 |
| 2007/0245414 A1 | * | 10/2007 | Chan | H04L 9/3234 726/12 |
| 2014/0013110 A1 | * | 1/2014 | Thoniel | H04L 9/321 713/156 |
| 2020/0250661 A1 | * | 8/2020 | Padmanabhan | G06Q 20/3827 |
| 2020/0328902 A1 | * | 10/2020 | Wang | H04L 9/0838 |
| 2020/0403812 A1 | * | 12/2020 | Ajitomi | H04L 9/321 |

* cited by examiner

*Primary Examiner* — Ghodrat Jamshidi
(74) *Attorney, Agent, or Firm* — Nicholson De Vos Webster & Elliott, LLP

(57) ABSTRACT

Techniques for validating digital certificate information before signing are described. A method of validating digital certificate information before signing may include generating a to-be-signed (TBS) certificate, providing the TBS certificate to a certificate pre-issuance validation service to perform one or more validations on the TBS certificate, and receiving a request to issue a signed certificate based on the TBS certificate following validation of the TBS certificate by the certificate pre-issuance validation service.

20 Claims, 8 Drawing Sheets

GENERATING A TO-BE-SIGNED CERTIFICATE FOR A DIGITAL CERTIFICATE, THE TBS CERTIFICATE INCLUDING INFORMATION TO BE INCLUDED IN THE DIGITAL CERTIFICATE WITHOUT A DIGITAL SIGNATURE 502

↓

PROVIDING THE TO-BE-SIGNED CERTIFICATE TO A CERTIFICATE PRE-ISSUANCE VALIDATION SERVICE TO PERFORM ONE OR MORE VALIDATIONS ON THE TO-BE-SIGNED CERTIFICATE 504

↓

RECEIVING A REQUEST TO ISSUE A SIGNED CERTIFICATE BASED ON THE TO-BE-SIGNED CERTIFICATE FOLLOWING VALIDATION OF THE TO-BE-SIGNED CERTIFICATE BY THE CERTIFICATE PRE-ISSUANCE VALIDATION 506

```
500 ~ CreateToBeSignedCertificate{

--csrExtensionOverrides
         certificatePolicies={
           "policy":[
              <policy references>
              ],
            CPS=<CPS reference>
         },
         authorityInfoAccess= {
             "caIssuers":<reference to CA>},
         CTPreCertificateSCTs={
              "SignedCertificateTimestamp": {
                     "name": <name>
                     "logID": <log identifier>
                     "Timestamp": <timestamp>
                     "extensions": <extensions>
                      "Signature": {
                                 "Signature Algorithm": <algorithm reference>,
                                 "Signature": <signature>                     }
                 },
             "SignedCertificateTimestamp": {
                     "name": <name>
                     "logID": <log identifier>
                     "Timestamp": <timestamp>
                     "extensions": <extensions>
                      "Signature": {
                                 "Signature Algorithm": <algorithm reference>,
                                 "Signature": <signature>                     }
                 }
             }
         }
    --serial <serial number>

502 ~ GetToBeSignedCertificate(TBS_Certificate [reference to TBS Certificate])

504 ~ IssueToBeSignedCertificate(TBS_Certificate [reference to TBS Certificate])
```

*FIG. 4*

VALIDATING CERTIFICATE INFORMATION BEFORE SIGNING

BACKGROUND

Asymmetric cryptography systems use pairs of keys, including public keys and private keys, to encrypt and decrypt data. For example, a public key infrastructure (PKI) uses pairs of public and private keys to facilitate secure electronic communication. Public keys can be associated with digital certificates that certify the owner of a given public key. The digital certificates are created and signed by a public certificate authority which acts as a trusted third party. Various digital certificates can be used, e.g., to create secure connections over a network, such as the Internet. For example, Hypertext Transfer Protocol Secure (HTTPS) uses digital certificates to establish secure connections using Transport Layer Security (TLS).

BRIEF DESCRIPTION OF DRAWINGS

Various embodiments in accordance with the present disclosure will be described with reference to the drawings, in which:

FIG. 4 illustrates example application programming interfaces for validating digital certificate information before signing, according to some embodiments.

DETAILED DESCRIPTION

The present disclosure relates to methods, apparatus, systems, and non-transitory computer-readable storage media for validating certificate information prior to signing the certificate using a validation system. According to some embodiments, before a digital certificate is created and signed, a certificate management system can generate a to-be-signed (TBS) certificate. The TBS certificate can include information that a signed certificate includes but without yet being signed by a certificate authority (CA). The TBS certificate can be provided to a certificate pre-issuance validation service to perform one or more validations on the TBS certificate. For example, the TBS certificate can be returned to the person, machine, or other entity (e.g., "requestor") who requested creation of the TBS certificate. The requestor can then provide the TBS certificate to the certificate pre-issuance validation service for validation. The validations performed on a given TBS certificate can be specified by the requestor or may include one or more default validations provided by the certificate pre-issuance validation service. Once the TBS certificate has been validated, a request to issue a certificate based on the TBS can be received by the certificate management service and the CA can issue a signed certificate.

Public certificate authorities need to be very careful about the certificates they issue. Signing a certificate that includes incorrect information results in a lengthy and costly disclosure process that negatively impacts the reputation of, and undermines public confidence in, the certificate authority. Issuing a certificate includes formulating a "to-be-signed" (TBS) certificate, which may include all of the information of the certificate except the signature. Typically, the process of issuing the certificate is for the CA to construct the TBS and then sign it immediately, which can result in mis-issuance. Embodiments prevent a mis-issuance by first obtaining the TBS certificate from a CA, and then validating the TBS certificate with a certificate pre-issuance validation service prior to issuance of the signed certificate. If valid, the TBS certificate can be returned to the CA requesting that the signed digital certificate be issued. As the TBS certificate includes all of the information to be included in the signed digital certificate except for the digital signature, the certificate authority can issue the signed digital certificate by signing the validated TBS certificate. By separately validating the actual object (e.g., the TBS certificate) that is being signed, embodiments avoid the risk of mis-issuing a certificate. Embodiments are generally discussed with respect to generating digital public certificates, however similar techniques may also be utilized when generating digital private certificates.

Figure 1:
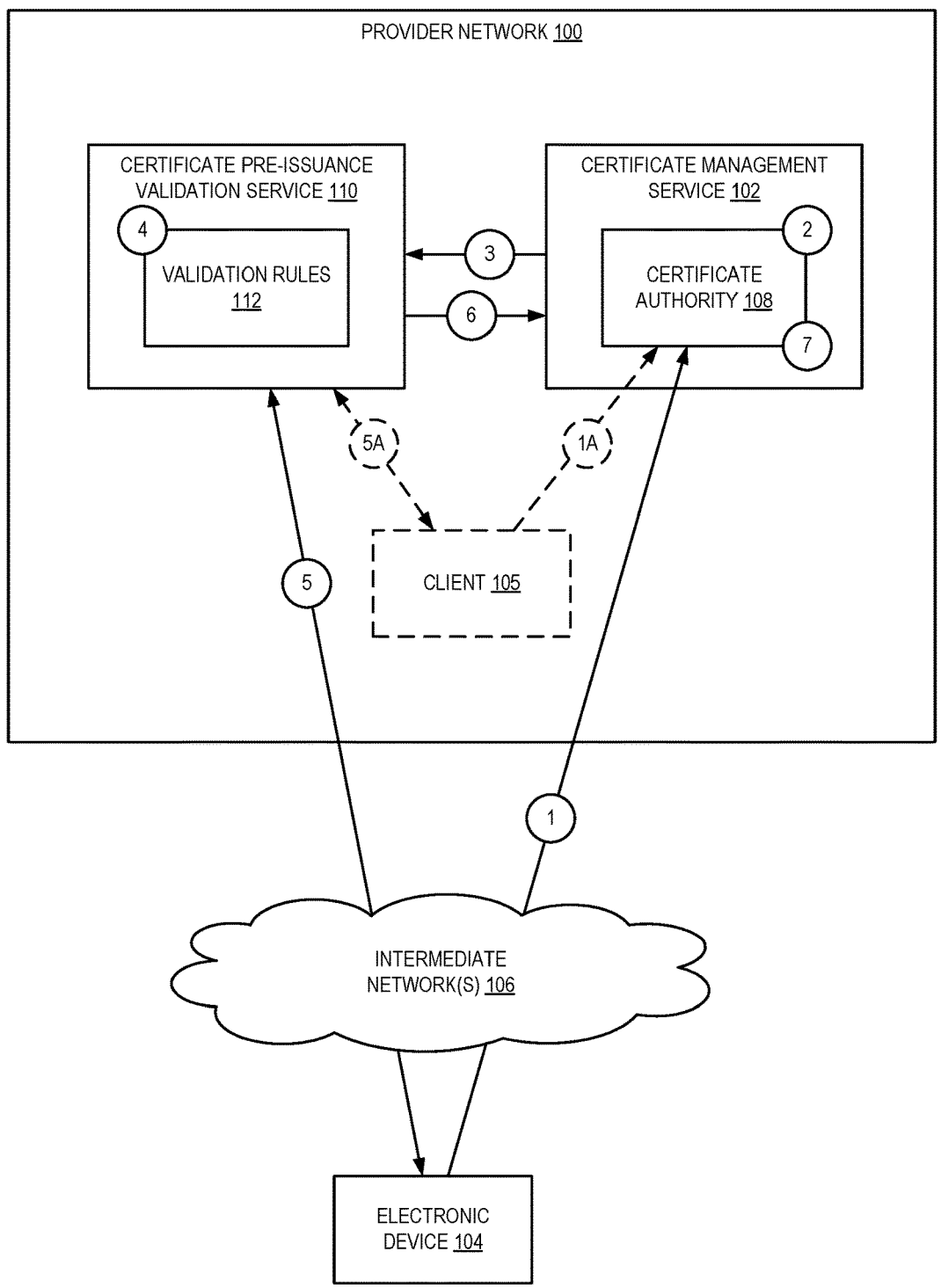
FIG. 1 is a diagram illustrating an environment for validating digital certificate information before signing, according to some embodiments.

FIG. 1 is a diagram illustrating an environment for validating digital certificate information before signing, according to some embodiments. As discussed, embodiments include a certificate pre-issuance validation service which can be used to perform one or more validations on a TBS certificate before it is signed by a certificate authority. As discussed further below, the certificate pre-issuance validation service and/or the certificate authority may be implemented in a provider network.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a customer (e.g., a user, application, etc.) using electronic device 104 can send a request to a certificate management service 102, via one or more intermediate networks 106, for a digital certificate at numeral 1. In some embodiments, the request at numeral 1 can be an application programming interface (API) request. Additionally, or alternatively, the request sent at numeral 1 may originate from a client application or device 105 internal to provider network 100, as shown at numeral 1A. The certificate management service 102 may include a certificate authority 108 which generates and signs public certificates. In some embodiments, the certificate authority of certificate management service 102 may generate and sign private certificates. In some embodiments, the certificate management service 102 may include multiple certificate authorities some of which issue public certificates and some of which issue private certificates. As discussed, certificate authorities are responsible for avoiding mis-issuance of certificates. As such, embodiments include a certificate pre-issuance validation service 110 which can apply one or more validation rules 112 to a certificate before it is signed.

As discussed, when a certificate authority generates a digital certificate, the certificate authority can first generate a to-be-signed (TBS) certificate that includes the information that would be included in the signed digital certificate but without the signature. The TBS certificate is the final object that is created by the certificate authority before it is signed, creating a signed digital certificate. Unlike traditional systems which create a TBS certificate and then immediately sign it to create the signed certificate, embodiments provide the TBS certificate to another system (e.g., in this example certificate pre-issuance validation service 110) to validate the TBS certificate prior to signing the certificate. This reduces the risk of mis-issuance by validating the actual object that will be signed rather than some other version of the object or just the information that is to be included in the digital certificate. Performing validation any earlier in the process of creating the digital certificate adds the risk that information will change after validation and before signing, resulting in mis-issuance. At numeral 2, in response to the request received at numeral 1 to create a digital certificate, the certificate authority generates a TBS certificate. In some embodiments, the request at numeral 1 is an API request to generate the TBS certificate. The API request can include information to create the TBS certificate (e.g., a public key, information identifying the owner of the public key, etc.) and may include an identifier (e.g., a Uniform Resource Locator (URL)) associated with an endpoint of the certificate pre-issuance validation service 110). At numeral 3 the certificate management service 102 can provide the generated TBS to the certificate pre-issuance validation service 110 based on the request.

As shown in FIG. 1, at numeral 4, the certificate pre-issuance validation service 110 can apply one or more validation rules 112 to the TBS certificate. The validation rules can include custom rules provided by a user or customer and/or default validation rules provided by the certificate pre-issuance validation service 110. In some embodiments, the certificate pre-issuance validation service 110 may maintain custom rules for a plurality of customers. The custom rules can be hosted by the certificate pre-issuance validation service 110 and accessed via an associated endpoint of the certificate pre-issuance validation service 110.

In some embodiments, the rules may be implemented as one or more templates which define the attributes and ordering of attributes to be included in a digital certificate. In some embodiments, the certificate pre-issuance validation service 110 may be a certificate transparency (CT) log which is an append-only record of certificates. The requestor (e.g., electronic device 104 or client 105) can then verify the TBS certificate with the certificate pre-issuance validation service 110 for authenticity, as shown at numerals 5 and 5A.

At numeral 6, once the TBS certificate has been validated, a request can be sent to the certificate management service 102 to create a signed certificate based on the TBS certificate. The request at numeral 6 can be an API request that includes the TBS certificate or a reference to the TBS certificate which can be used by the certificate management service 102 to obtain the TBS certificate. At numeral 7, the certificate authority 108 can generate the signed digital certificate. The signed digital certificate can include all of the information from the TBS certificate and additionally include the digital signature of the certificate authority 108. Once generated, the signed digital certificate can be returned to the requestor (e.g., electronic device 104 or client 105) or maintained by the certificate management service 102.

Figure 2:
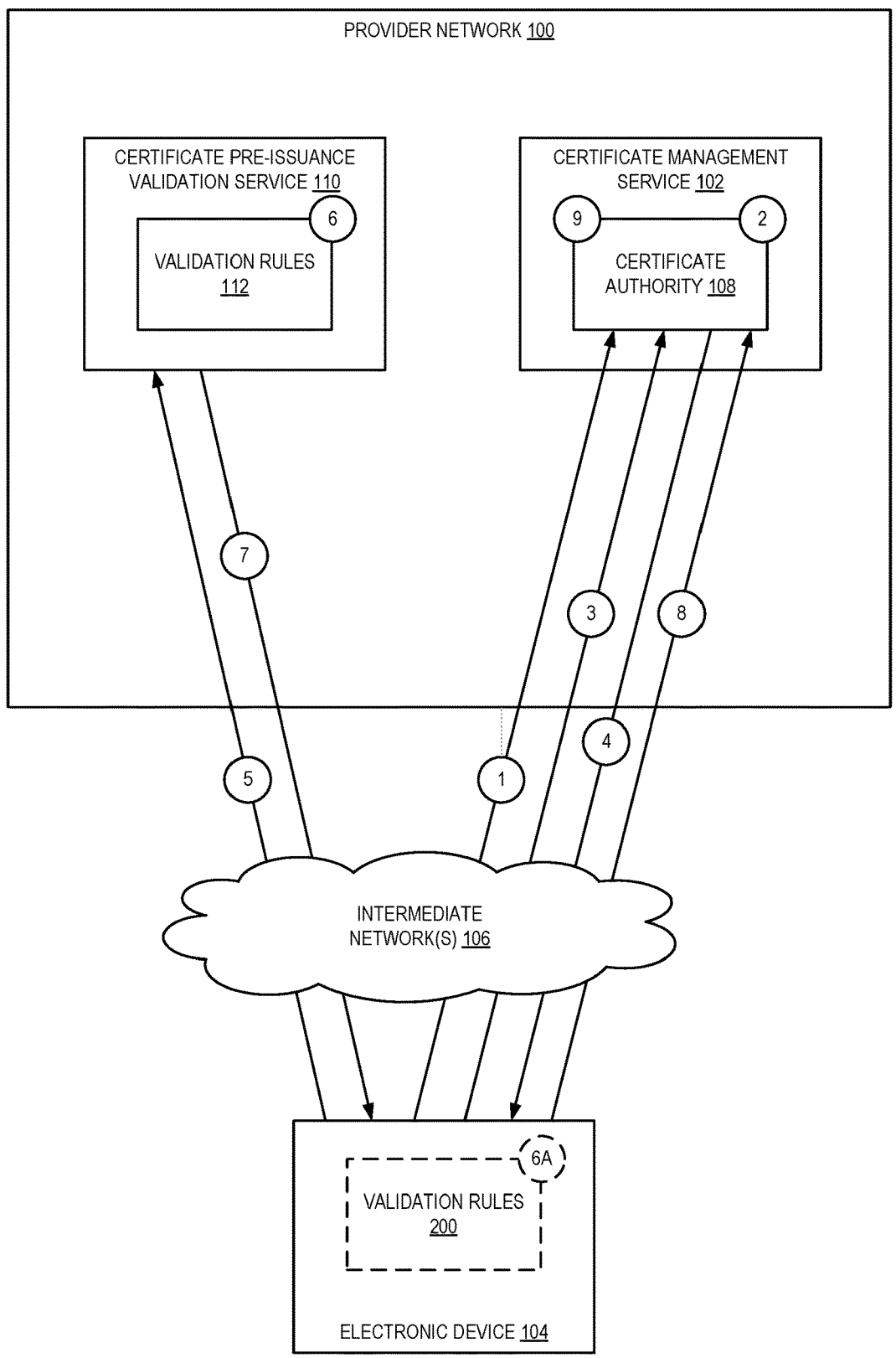
FIG. 2 is a diagram illustrating an alternative environment for validating digital certificate information before signing, according to some embodiments.

FIG. 2 is a diagram illustrating an alternative environment for validating digital certificate information before signing, according to some embodiments. In some embodiments, the certificate management service 102 and the certificate pre-issuance validation service 110 may not communicate directly. Instead, the requestor (e.g., a user, application, etc.) using electronic device 104 can obtain the TBS certificate and validate it with the certificate pre-issuance validation service 110 before requesting a signed certificate from the certificate management service 102, as shown in FIG. 2. For example, as shown at numeral 1, the requestor can send a request to a certificate management service 102, via one or more intermediate networks 106, for a digital certificate at numeral 1. As discussed above with respect to FIG. 1, in some embodiments, the requestor can be a client application or device internal to provider network 100. The processing in such an embodiment would proceed similarly to that discussed with respect to an external requestor.

In some embodiments, the request at numeral 1 can be an application programming interface (API) request to create a TBS certificate. As discussed, certificate authorities are responsible for avoiding mis-issuance of certificates. As such, rather than immediately signing the TBS certificate based on the request at numeral 1, in some embodiments the certificate authority 108 can generate a TBS certificate at numeral 2. The TBS certificate can be provided to the requestor validate prior to issuance of a signed digital certificate. For example, at numeral 3, the requestor can send a request for the TBS certificate. This request may also be an API request which identifies at least one TBS certificate that has been generated to be returned to the requestor. At numeral 4, the certificate authority can return the TBS certificate to the requestor. As discussed, the TBS certificate includes the information that would be included in the signed digital certificate but without the signature. Unlike traditional systems which create a TBS certificate and then immediately sign it to create the signed certificate, embodiments provide the TBS certificate to another system (e.g., in this example certificate pre-issuance validation service 110) to validate the TBS certificate prior to signing the certificate. This reduces the risk of mis-issuance.

At numeral 5, the requestor can provide the TBS certificate to the certificate pre-issuance validation service 110 based on the request. As shown in FIG. 2, at numeral 6, the certificate pre-issuance validation service 110 can apply one or more validation rules 112 to the TBS certificate. The validation rules can include custom rules provided by a user and/or default validation rules provided by the certificate pre-issuance validation service 110. In some embodiments, the certificate pre-issuance validation service 110 may maintain custom rules for a plurality of customers. The custom rules can be hosted by the certificate pre-issuance validation service 110 and accessed via an associated endpoint of the certificate pre-issuance validation service 110. In some embodiments, the rules may be implemented as one or more templates which define the attributes and ordering of attributes to be included in a digital certificate. In some embodiments, the certificate pre-issuance validation service 110 may be a certificate transparency (CT) log which is an append-only record of certificates. The requestor (e.g., electronic device 104 or client 105) can then verify the TBS certificate with the certificate pre-issuance validation service 110 for authenticity, as shown at numerals 5 and 5A.

At numeral 6, once the TBS certificate has been validated, a request can be sent to the certificate management service 102 to create a signed certificate based on the TBS certificate. The request at numeral 6 can be an API request that includes the TBS certificate or a reference to the TBS certificate which can be used by the certificate management service 102 to obtain the TBS certificate. Additionally, or alternatively, at numeral 6A, the TBS certificate can be validated using validation rules 200 maintained by the requestor, such as on electronic device 104 or other location accessible to electronic device 104. At numeral 7, the certificate pre-issuance validation service 110 can return a validation response to the requestor indicating whether the TBS certificate is valid. If valid, based on the validations performed by certificate pre-issuance validation service 110 or locally using validation rules 200, then at numeral 8, a request can be sent to the certificate authority 108 to generate the signed digital certificate. In some embodiments, the request can include the TBS certificate or a reference thereto. At numeral 9, the certificate authority can generate a digital certificate that includes all of the information from the TBS certificate associated with the request at numeral 8 and additionally include the digital signature of the certificate authority 108. Once generated, the signed digital certificate can be returned to the requestor (e.g., electronic device 104 or client 105) or maintained by the certificate management service 102.

Figure 3:
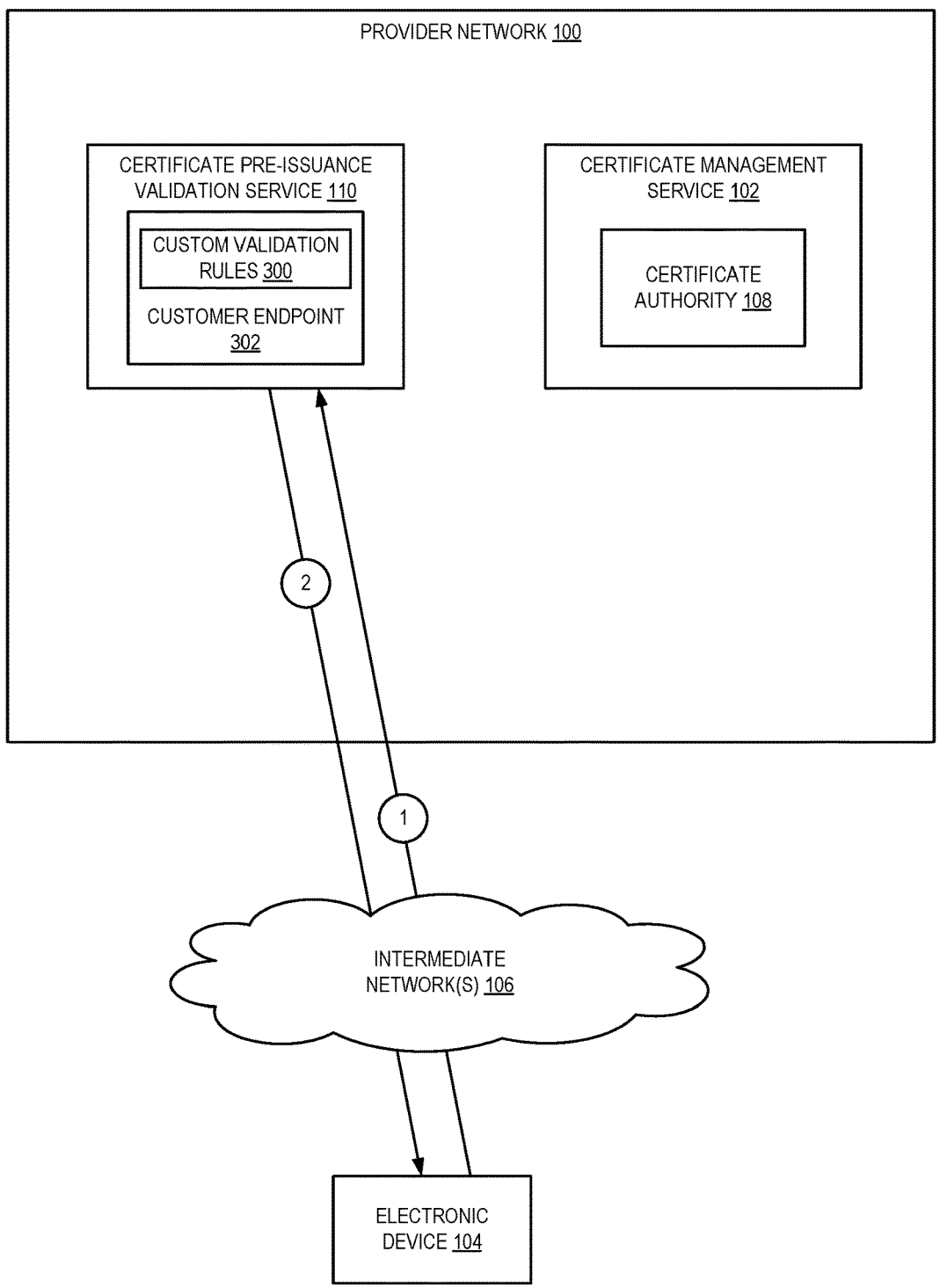
FIG. 3 is a diagram illustrating an environment for defining custom validation rules, according to some embodiments.

FIG. 3 is a diagram illustrating an environment for defining custom validation rules, according to some embodiments. As shown in FIG. 3, in some embodiments a customer can provide their own validation rules 300 for use by the certificate pre-issuance validation service 110 when validating a TBS certificate. At numeral 1, the customer can provide custom validation rules 300 to the certificate pre-issuance validation service 110. The certificate pre-issuance validation service 110 can then add the custom validation rules 300 to a customer endpoint 302 associated with the customer. As discussed, in some embodiments, the customer can validate a TBS certificate by providing a copy of the TBS certificate to an endpoint of the certificate pre-issuance validation service 110. The certificate pre-issuance validation service 110 can then apply the rules associated with that endpoint to the received TBS certificate and return a validation result indicating whether the TBS certificate complied with the validation rules. Once the custom rules have been added to the customer's endpoint, at numeral 2 a confirmation can be returned indicating that the custom rules are ready to be applied to TBS certificates. The customer can then validate TBS certificates using the custom rules, as discussed above with respect to FIGS. 1 and 2.

FIG. 4 illustrates example application programming interfaces (APIs) for validating digital certificate information before signing, according to some embodiments. As shown in FIG. 4, and as discussed above, embodiments can use a plurality of APIs to validate digital certificates prior to issuing a signed digital certificate. For example, as shown in FIG. 4, the APIs may include a CreateToBeSignedCertificate 500, a GetToBeSignedCertificate 502, and an IssueToBeSignedCertificate 504. As shown in FIG. 4, CreateToBeSignedCertificate can be used to request a TBS certificate be created and allows the caller to specify certificatePolicies, Certification Practice Statement (CPS), authorityInfoAccess, CTPreCertificateSCTs in the CSRExtensionOverrides parameter, ValidityNotBefore, and a serial number. The Serial parameter may be the certificate serial number, which can be assigned as a random x-bit number by the certificate authority. This can be specified in the request to ensure that the final public certificate serial number is be the same as the pre-certificate serial number. In some embodiments, a response to the CreateToBeSignedCertificate request can include a reference to the created TBS certificate. This reference can be returned to the requestor.

Once the TBS certificate has been created in response to a CreateToBeSignedCertificate, the GetToBeSignedCertificate 502 can be used to obtain the TBS certificate. As noted above, the response to the CreateToBeSignedCertificate may include a reference to the TBS certificate. The GetToBeSignedCertificate request can include this reference and return the TBS certificate to the requestor. As discussed, the TBS certificate can then be validated, e.g., using certificate pre-issuance validation service 110 described above, or by the requestor's own validation system. Once validated, an IssueToBeSignedCertificate request can be used to instruct the certificate authority to create a signed digital certificate for the validated TBS certificate. As shown in FIG. 4, the IssueToBeSignedCertificate request can include a reference to the TBS certificate for which the signed digital certificate is to be created.

Figure 5:
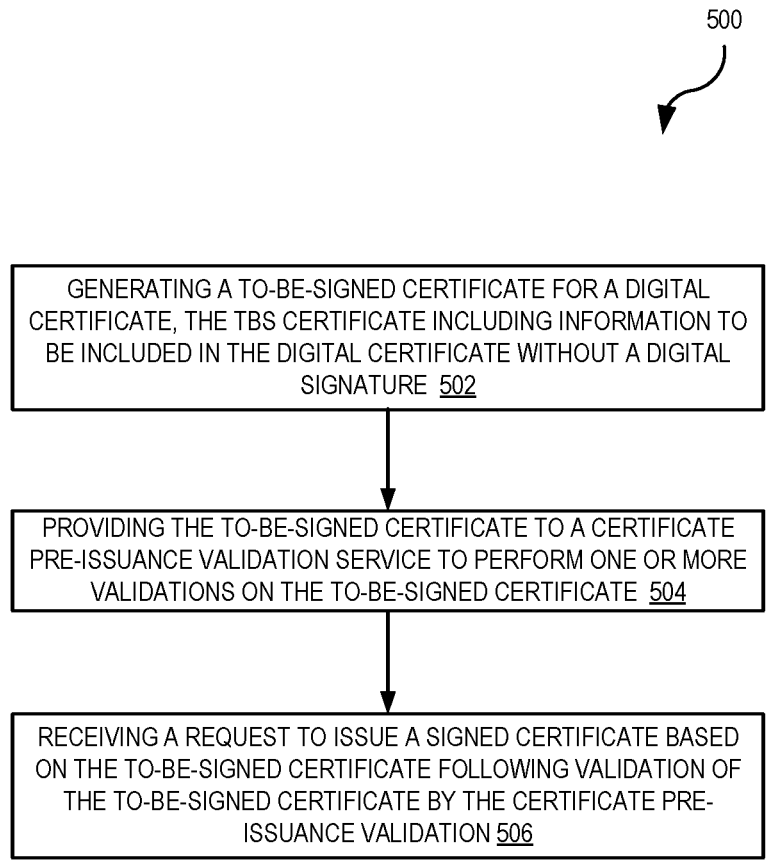
FIG. 5 is a flow diagram illustrating operations of a method for validating digital certificate information before signing according to some embodiments.

FIG. 5 is a flow diagram illustrating operations 500 of a method for validating digital certificate information before signing according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by certificate pre-issuance validation service 110, certificate management service 102, etc. of the other figures.

The operations 500 include, at block 502, generating a to-be-signed (TBS) certificate for a digital certificate, the TBS certificate including information to be included in the digital certificate without a digital signature. In some embodiments, the operations 500 further include receiving a request to generate the TBS certificate, the request comprising a first application programming interface (API) request that includes a public key, a validity period, and a serial number, and returning a reference to the TBS certificate after generating the TBS certificate.

The operations 500 further include, at block 504, providing the TBS certificate to a certificate pre-issuance validation service to perform one or more validations on the TBS certificate based on one or more validation rules. In some embodiments, the one or more validation rules are provided by a requestor of the TBS certificate. In some embodiments, the one or more validation rules are provided by the certificate pre-issuance validation service. In some embodiments, providing the TBS certificate to a certificate pre-issuance validation service to perform one or more validations on the TBS certificate, further comprises receiving a request for the TBS certificate from a requestor, the request comprising a second API request that includes the reference to the TBS certificate, and returning the TBS to the requestor, wherein the requestor provides the TBS certificate to the certificate pre-issuance validation service for validation. In some embodiments, providing the TBS certificate to a certificate pre-issuance validation service to perform one or more validations on the TBS certificate further comprises providing the TBS certificate to an endpoint of the certificate pre-issuance validation service for validation, wherein the request for the TBS certificate includes the endpoint of the certificate pre-issuance validation service to which to provide the TBS certificate.

The operations 500 further include, at block 506, receiving a request to issue a signed certificate based on the TBS certificate following validation of the TBS certificate by the certificate pre-issuance validation service. In some embodiments, the operations 500 further include issuing, by a certificate authority, the signed certificate, the signed certificate including information from the TBS certificate and a digital signature. In some embodiments, issuing the signed certificate comprises adding the digital signature to the TBS certificate In some embodiments, the requestor receives a validation response from the certificate pre-issuance validation service indicating the TBS certificate is valid based on the one or more validation rules. In some embodiments, the request to issue the signed certificate based on the TBS certificate is received from the requestor after the requestor receives the validation response indicating that the TBS certificate is valid, and wherein the request to issue the signed certificate comprises a third API call that includes the reference to the TBS certificate.

In some embodiments, the operations include receiving, by a certificate authority, a request to generate a to-be-signed (TBS) certificate, generating, by the certificate authority, the TBS certificate, receiving, by the certificate authority, a request for the TBS certificate, returning, by the certificate authority, the TBS certificate, wherein the TBS certificate is validated by a certificate pre-issuance validation service using one or more validation rules, and issuing, by the certificate authority, a signed digital public certificate based on the TBS certificate following validation of the TBS certificate by the certificate pre-issuance validation service, the signed digital public certificate comprising the validated TBS certificate and a digital signature.

In some embodiments, returning, by the certificate authority, the TBS certificate, wherein the TBS certificate is validated by a certificate pre-issuance validation service using one or more validation rules, further comprises providing the TBS certificate to a user in response to the request for the TBS certificate from the user, wherein the user provides the TBS certificate to the certificate pre-issuance validation service. In some embodiments, returning, by the certificate authority, the TBS certificate, wherein the TBS certificate is validated by a certificate pre-issuance validation service using one or more validation rules, further comprises providing the TBS certificate to an endpoint of the certificate pre-issuance validation service for validation, wherein the request for the TBS certificate includes the endpoint of the certificate pre-issuance validation service to which to provide the TBS certificate.

Figure 6:
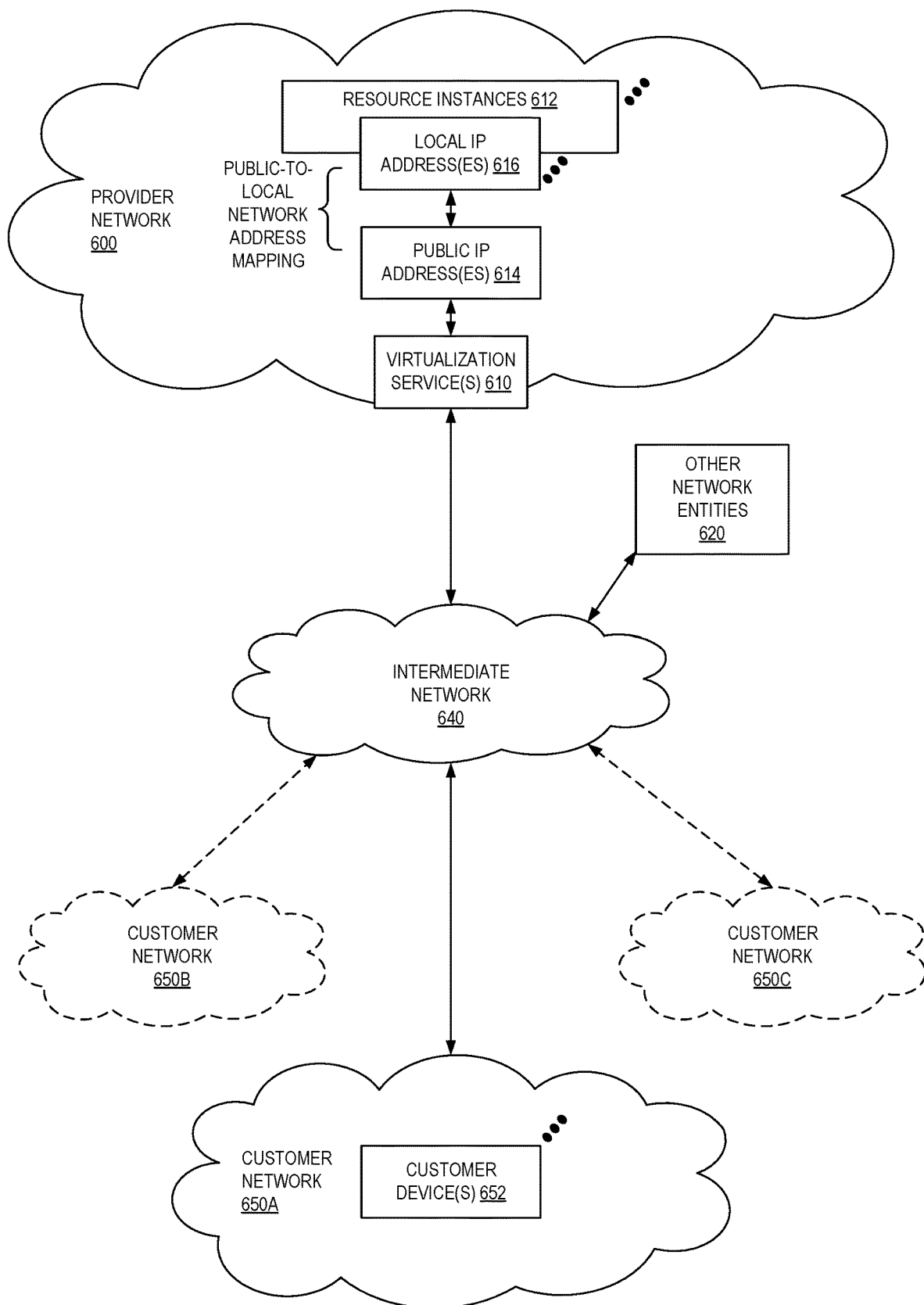
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
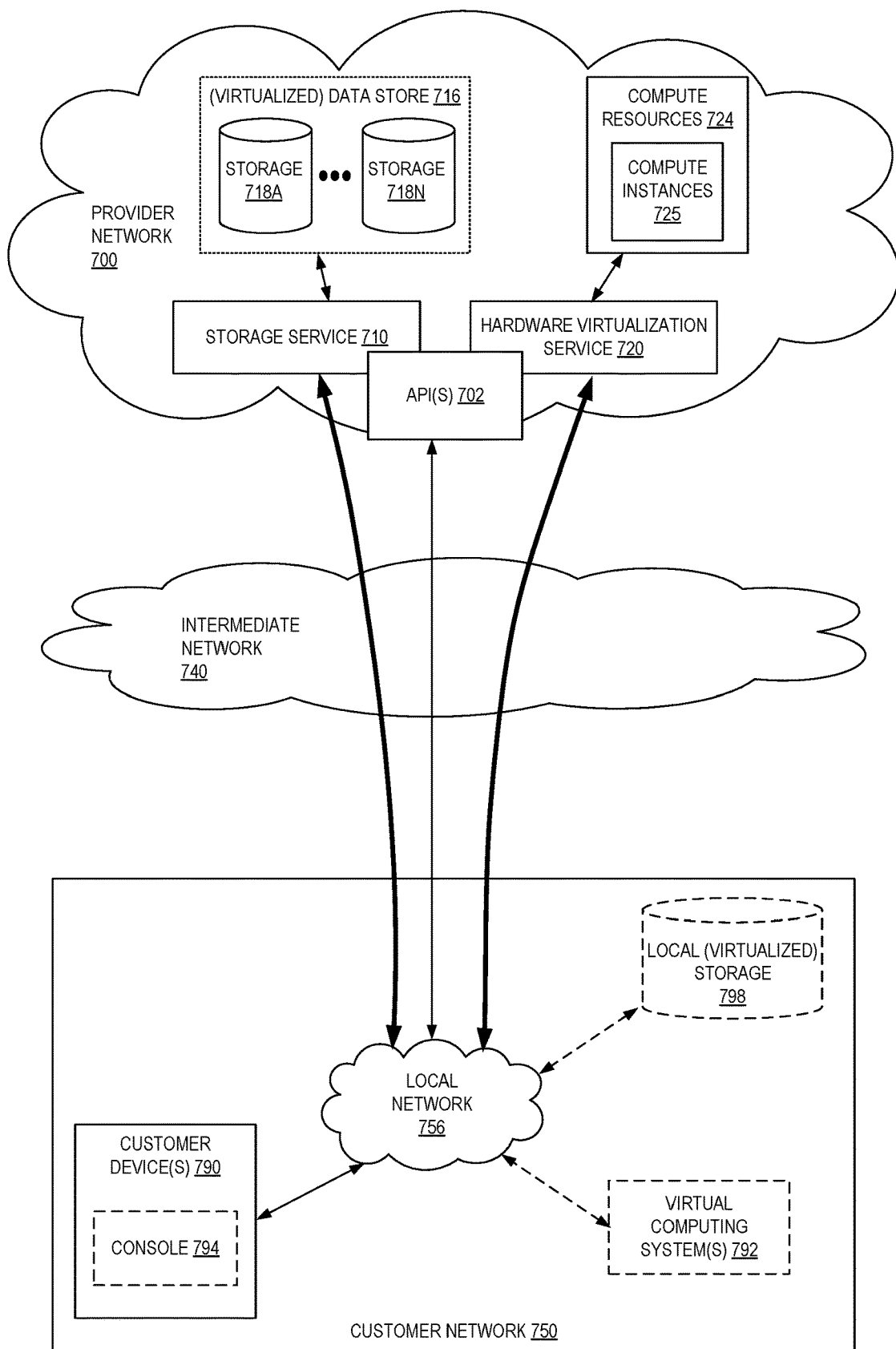
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
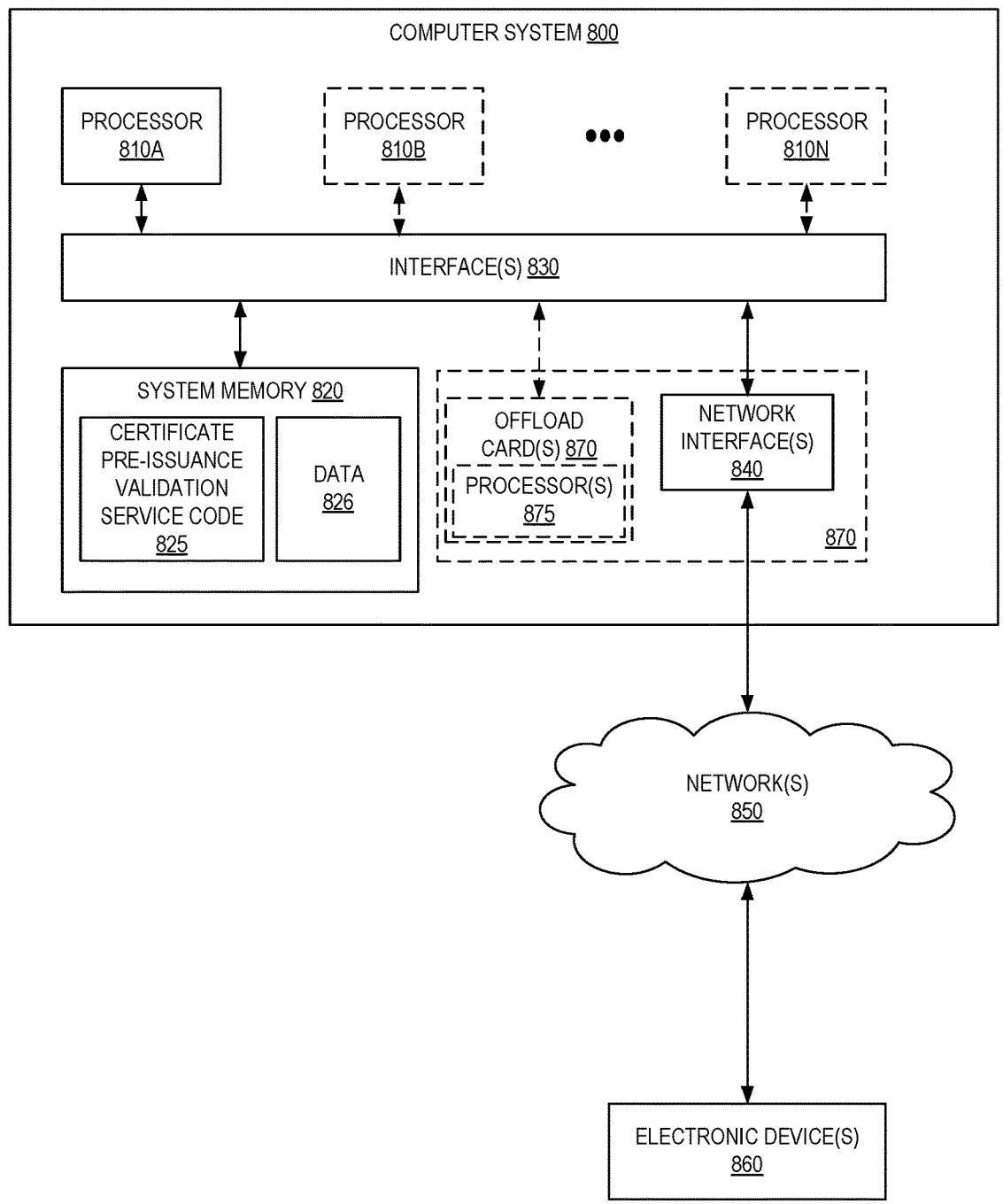
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as certificate pre-issuance validation service code 825 (e.g., executable to implement, in whole or in part, the certificate pre-issuance validation service 110) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to generate a to-be-signed (TBS) certificate for a digital certificate, the request comprising a first application programming interface (API) request that includes a public key, a validity period, and a serial number;
   generating the TBS certificate, the TBS certificate including information to be included in the digital certificate without a digital signature;
   returning a reference to the TBS certificate after generating the TBS certificate;
   providing the TBS certificate to a certificate pre-issuance validation service to perform one or more validations on the TBS certificate based on one or more validation rules, comprising:

receiving a request for the TBS certificate from a requestor, the request comprising a second API request that includes the reference to the TBS certificate, and returning the TBS certificate to the requestor, wherein the requestor provides the TBS certificate to the certificate pre-issuance validation service for validation; and receiving a request to issue a signed certificate based on the TBS certificate following validation of the TBS certificate by the certificate pre-issuance validation service.

2. The computer-implemented method of claim 1, further comprising:

issuing, by a certificate authority, the signed certificate, the signed certificate is the validated TBS certificate and a digital signature.

3. The computer-implemented method of claim 1, wherein the one or more validation rules are provided by the requestor of the TBS certificate.

4. The computer-implemented method of claim 1, wherein the one or more validation rules are provided by the certificate pre-issuance validation service.

5. The computer-implemented method of claim 1, wherein the requestor receives a validation response from the certificate pre-issuance validation service indicating the TBS certificate is valid based on the one or more validation rules.

6. The computer-implemented method of claim 5, wherein the request to issue the signed certificate based on the TBS certificate is received from the requestor after the requestor receives the validation response indicating that the TBS certificate is valid, and wherein the request to issue the signed certificate comprises a third API call that includes the reference to the TBS certificate.

7. The computer-implemented method of claim 1, wherein providing the TBS certificate to a certificate pre-issuance validation service to perform one or more validations on the TBS certificate further comprises:

providing the TBS certificate to an endpoint of the certificate pre-issuance validation service for validation, wherein the request for the TBS certificate includes the endpoint of the certificate pre-issuance validation service to which to provide the TBS certificate.

8. A system comprising:

a first one or more electronic devices to implement a certificate pre-issuance validation service in a multi-tenant provider network; and a second one or more electronic devices to implement a certificate management service in the multi-tenant provider network, the certificate management service including instructions that upon execution cause the certificate management service to:

receive a request to generate a to-be-signed (TBS) certificate for a digital certificate, the request comprising a first application programming interface (API) request that includes a public key, a validity period, and a serial number;

generate the TBS certificate, the TBS certificate including information to be included in the digital certificate without a digital signature;

return a reference to the TBS certificate after generating the TBS certificate;

provide the TBS certificate to the certificate pre-issuance validation service to perform one or more validations on the TBS certificate based on one or more validation rules, comprising:

receiving a request for the TBS certificate from a requestor, the request comprising a second API request that includes the reference to the TBS certificate, and returning the TBS certificate to the requestor, wherein the requestor provides the TBS certificate to the certificate pre-issuance validation service for validation; and issue a signed certificate in response to a request to issue the signed certificate, the request including the TBS certificate, following validation of the TBS certificate by the certificate pre-issuance validation service.

9. The system of claim 8, wherein the instructions, when executed, further cause the certificate management service to:

receive the request to issue the signed certificate, the signed certificate comprising the validated TBS certificate and a digital signature.

10. The system of claim 8, wherein to issue a signed certificate in response to a request to issue the signed certificate, the request including the TBS certificate, following validation of the TBS certificate by the certificate pre-issuance validation service, the instructions, when executed, further cause the certificate management service to:

add the digital signature to the TBS certificate.

11. The system of claim 8, wherein the one or more validation rules are provided by the certificate pre-issuance validation service.

12. The system of claim 8, wherein the signed certificate is a signed public digital certificate.

13. The system of claim 12, wherein the signed certificate is a signed private digital certificate.

14. One or more non-transitory computer readable storage media storing instructions, which when executed by one or more computing devices, cause the one or more computing devices to perform operations comprising:

receiving a request to generate a to-be-signed (TBS) certificate for a digital certificate, the request comprising a first application programming interface (API) request that includes a public key, a validity period, and a serial number;

generating the TBS certificate, the TBS certificate including information to be included in the digital certificate without a digital signature;

returning a reference to the TBS certificate after generating the TBS certificate;

providing the TBS certificate to a certificate pre-issuance validation service to perform one or more validations on the TBS certificate based on one or more validation rules, comprising:

receiving a request for the TBS certificate from a requestor, the request comprising a second API request that includes the reference to the TBS certificate, and returning the TBS certificate to the requestor, wherein the requestor provides the TBS certificate to the certificate pre-issuance validation service for validation; and receiving a request to issue a signed certificate based on the TBS certificate following validation of the TBS certificate by the certificate pre-issuance validation service.

15. The one or more non-transitory computer readable storage media of claim 14, wherein the operations further include:

issuing, by a certificate authority, the signed certificate, the signed certificate is the validated TBS certificate and a digital signature.

16. The one or more non-transitory computer readable storage media of claim 14, wherein the one or more validation rules are provided by the requestor of the TBS certificate.

17. The one or more non-transitory computer readable storage media of claim 14, wherein the one or more validation rules are provided by the certificate pre-issuance validation service.

18. The one or more non-transitory computer readable storage media of claim 14, wherein the requestor receives a validation response from the certificate pre-issuance validation service indicating the TBS certificate is valid based on the one or more validation rules.

19. The one or more non-transitory computer readable storage media of claim 18, wherein the request to issue the signed certificate based on the TBS certificate is received from the requestor after the requestor receives the validation response indicating that the TBS certificate is valid, and wherein the request to issue the signed certificate comprises a third API call that includes the reference to the TBS certificate.

20. The one or more non-transitory computer readable storage media of claim 14, wherein providing the TBS certificate to a certificate pre-issuance validation service to perform one or more validations on the TBS certificate further comprises:
  providing the TBS certificate to an endpoint of the certificate pre-issuance validation service for validation, wherein the request for the TBS certificate includes the endpoint of the certificate pre-issuance validation service to which to provide the TBS certificate.

* * * * *